US009485996B2

(12) United States Patent  (10) Patent No.: US 9,485,996 B2
Ellis et al.  (45) Date of Patent: Nov. 8, 2016

(54) GAME DRESSING TOOL

(71) Applicants: Robert E. Ellis, Camillus, NY (US); Richard E. Ellis, Lafayette, NY (US)

(72) Inventors: Robert E. Ellis, Camillus, NY (US); Richard E. Ellis, Lafayette, NY (US)

(*) Notice: Subject to any disclaimer, the term of this patent is extended or adjusted under 35 U.S.C. 154(b) by 0 days.

(21) Appl. No.: 14/986,018

(22) Filed: Dec. 31, 2015

(65) Prior Publication Data

US 2016/0183539 A1  Jun. 30, 2016

Related U.S. Application Data

(60) Provisional application No. 62/207,604, filed on Aug. 20, 2015, provisional application No. 62/098,733, filed on Dec. 31, 2014.

(51) Int. Cl.
*A22B 5/18* (2006.01)
*A22B 5/00* (2006.01)

(52) U.S. Cl.
CPC ...... *A22B 5/0005* (2013.01); *A22B 2005/0011* (2013.01)

(58) Field of Classification Search
CPC .... A22C 17/06; A22C 21/06; A22C 21/063; A22B 5/0047
USPC ............ 452/185, 187–193, 197, 102–105, 6, 452/117
See application file for complete search history.

(56) References Cited

U.S. PATENT DOCUMENTS

| 391,268 | A | 10/1888 | Parker |
|---|---|---|---|
| 2,787,020 | A | 4/1957 | Hunt |
| 2,830,319 | A | 4/1958 | Muntz |
| 3,445,931 | A | 5/1969 | Knudson |
| 3,705,440 | A | 12/1972 | Lewis |
| 3,778,867 | A | 12/1973 | Sindler et al. |
| 3,949,447 | A | 4/1976 | Evers et al. |
| 4,023,303 | A * | 5/1977 | Maunu ................ A01K 97/18 43/53.5 |
| 4,063,331 | A | 12/1977 | O'Neal et al. |
| 4,208,764 | A | 6/1980 | Loth et al. |
| 4,587,690 | A | 5/1986 | Kress |
| 4,607,432 | A | 8/1986 | Montgomery |
| 4,998,324 | A | 3/1991 | Nagatomo |
| 5,167,568 | A | 12/1992 | Esbroeck et al. |
| 5,195,923 | A | 3/1993 | Rankin et al. |
| 5,386,635 | A | 2/1995 | Sheba |
| 5,462,479 | A | 10/1995 | Hajek |
| 5,474,492 | A | 12/1995 | Aubert |
| 5,549,521 | A | 8/1996 | van den Nieuwelaar et al. |
| 5,688,164 | A * | 11/1997 | Mills ............... A22B 5/0094 452/122 |
| 5,690,548 | A * | 11/1997 | Jones ................ A22B 5/0029 30/92 |
| 6,210,263 | B1 * | 4/2001 | Meyer ............... A22B 5/0094 452/120 |
| 6,244,949 | B1 * | 6/2001 | Moody .............. A22B 5/0094 452/122 |
| 6,338,674 | B1 * | 1/2002 | Finney ............... A22B 5/0094 452/122 |
| 6,364,758 | B1 | 4/2002 | Nielsen et al. |
| 6,578,271 | B1 | 6/2003 | Macek |
| 6,598,298 | B1 | 7/2003 | Bartlett |
| 6,811,478 | B2 | 11/2004 | van den Nieuwelaar et al. |

(Continued)

OTHER PUBLICATIONS

Never Without LLC, The Rectifier, http://shop.neverwithout1.com/The-Rectifier_c5.htm.

*Primary Examiner* — Richard Price, Jr.
(74) *Attorney, Agent, or Firm* — Barclay Damon, LLP

(57) ABSTRACT

A game dressing device, in one embodiment, comprising at least two legs, each coupled to at least one hook. A spring member that is configured to engage a portion of each of the legs and define a compressed state and an uncompressed state.

20 Claims, 6 Drawing Sheets

(56) References Cited

U.S. PATENT DOCUMENTS

| | | |
|---|---|---|
| 7,217,182 B1 | 5/2007 | McConnell et al. |
| 7,252,583 B1 | 8/2007 | Jones |
| 7,264,543 B2 | 9/2007 | Lay |
| 7,367,877 B1 | 5/2008 | Luster |
| 7,597,614 B2 | 10/2009 | Forbes et al. |
| 7,874,235 B2 | 1/2011 | Dittly |
| D684,659 S | 6/2013 | Quill |
| 8,454,414 B1 | 6/2013 | Simith |
| 2002/0173771 A1 | 11/2002 | Dono |
| 2009/0093205 A1 | 4/2009 | Lay |
| 2011/0252651 A1 | 10/2011 | Sewell |
| 2011/0256819 A1 | 10/2011 | Sewell |

* cited by examiner

GAME DRESSING TOOL

CROSS-REFERENCE TO RELATED APPLICATIONS

This application claims the benefit and priority of, U.S. Provisional Patent Application No. 62/207,604, filed on Aug. 20, 2015, and of, U.S. Provisional Patent Application No. 62/098,733, filed on Dec. 31, 2014. The entire contents of such applications are hereby incorporated by reference.

BACKGROUND

Big game hunting is a popular sport in North America and around the world. One of the main benefits of big game hunting is the meat that is provided by the animal being hunted. However, once the animal has been successfully put down, the meat becomes susceptible to spoilage through decomposition. There is also a risk of contamination by bacteria and other material leaking from the gastrointestinal tract and attached viscera. Hunters have become skilled at field dressing their quarry in order to delay the spoilage of the meat and the decomposition of the remaining carcass.

Generally, field dressing an animal comprises the removal of the viscera to prevent the meat from being contaminated by digestive juices, bacteria and fecal matter that may leak into the body cavity during decomposition. Moreover, removing the viscera and opening up the body cavity and anus also acts to increase the cooling rate of the meat which further delays decomposition.

One of the first steps of field dressing is to dissect the anus from the surrounding tissue at the posterior of the animal. This is a challenging procedure due to the small size of the anus when constricted, obstruction of the exterior of the anus by fur and the delicate tissue of the rectum. When this area is not secured properly, the hunter risks perforation of the rectum and contamination of the meat. Furthermore, the hunter also risks injury while attempting to perform incisions in the unstable area around the anus. There is a need for a device that mitigates the above-mentioned risks and is easy to use and maintain.

The foregoing background describes some, but not necessarily all, of the problems, disadvantages and shortcomings related to tools used to field dress big game.

SUMMARY

The present device allows the hunter to expand and secure the anus of the animal while allowing the anus to be safely dissected from the surrounding tissue, thereby making it easy to remove with the rest of the viscera once the abdominal cavity is opened. The larger opening created by dissecting around the expanded anus has the added benefit of providing increased air flow to aid in cooling the carcass. Moreover, the limited number of components and the presence of a protective coating make the present device easy to use and maintain.

In one embodiment, the dressing tool is configured to secure tissue surrounding and including an animal's anus. The dressing tool comprises two legs where each of the two legs has a first end and a second end, two hooks where each of the two hooks terminates the first end of one of the two legs, and a spring member. A portion of each of the two hooks comprises a sharpened area. The two hooks project away from each other at an angle that is less than 90 degrees relative to the leg it is attached to. The spring member is configured to couple each of the two legs at each of the second ends, forming an angle between the two legs that is less than 90 degrees. The spring member defines a first position when the spring member is uncompressed, and defines a second position when the spring member is compressed. The diameter of the spring member is less than the distance between the first ends of the two legs when the spring member is in the first position. Insertion of the two hooks while the dressing tool is in the second position prevents damage to body tissue. Applying a force to the two hooks in a direction opposite to that of insertion while in the first position grasps and retains the tissue surrounding the animal's anus.

Another embodiment provides a method for field dressing wild game providing a game dressing tool with two legs, wherein each leg includes a hook at a first end and wherein each leg is engaged with a spring member at a second end. Compressing the spring member to bring the two legs together defining a compressed state and anally inserting the two legs into the wild game while in the compressed state. Relaxing the spring member to move the two legs away from each other and exerting a force in a direction opposite that of insertion to set the hooks into the surrounding tissue. Dissecting around the anus of the wild game to free it from the surrounding tissue and making an abdominal incision in the wild game. Then, extracting the internal viscera, including the dissected anus, through the abdominal incision and removing the game dressing tool from the dissected and extracted anus. The abdominal incision and the dissected area enable air the move through the wild game carcass to cool and prevent spoilage of the meat.

Another embodiment of the game dressing device comprises at least two legs. The at least two legs each have a first end and a second end. The first end is attached to at least one hook. A spring member is configured to engage a portion of each of the legs. The spring member defines a compressed state and an uncompressed state. In the uncompressed state, the distance between each of the first ends is greater than the diameter of the spring member.

Additional features and advantages of the present disclosure are described in, and will be apparent from, the following Brief Description of the Drawings and Detailed Description.

DETAILED DESCRIPTION

Figure 1:
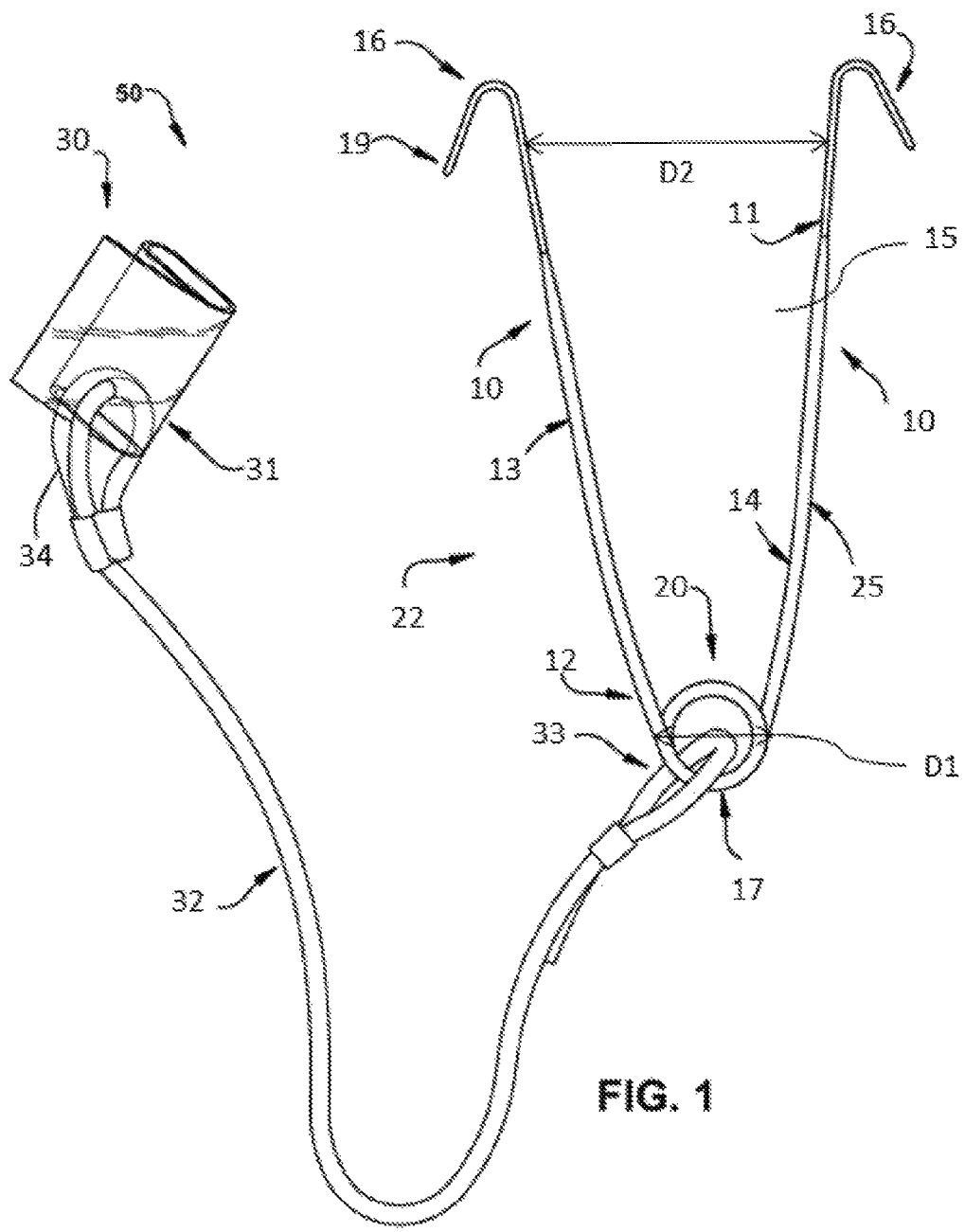
FIG. 1 illustrates an embodiment of the game dressing tool in the first position where the spring member is in an uncompressed state.
Figure 2:
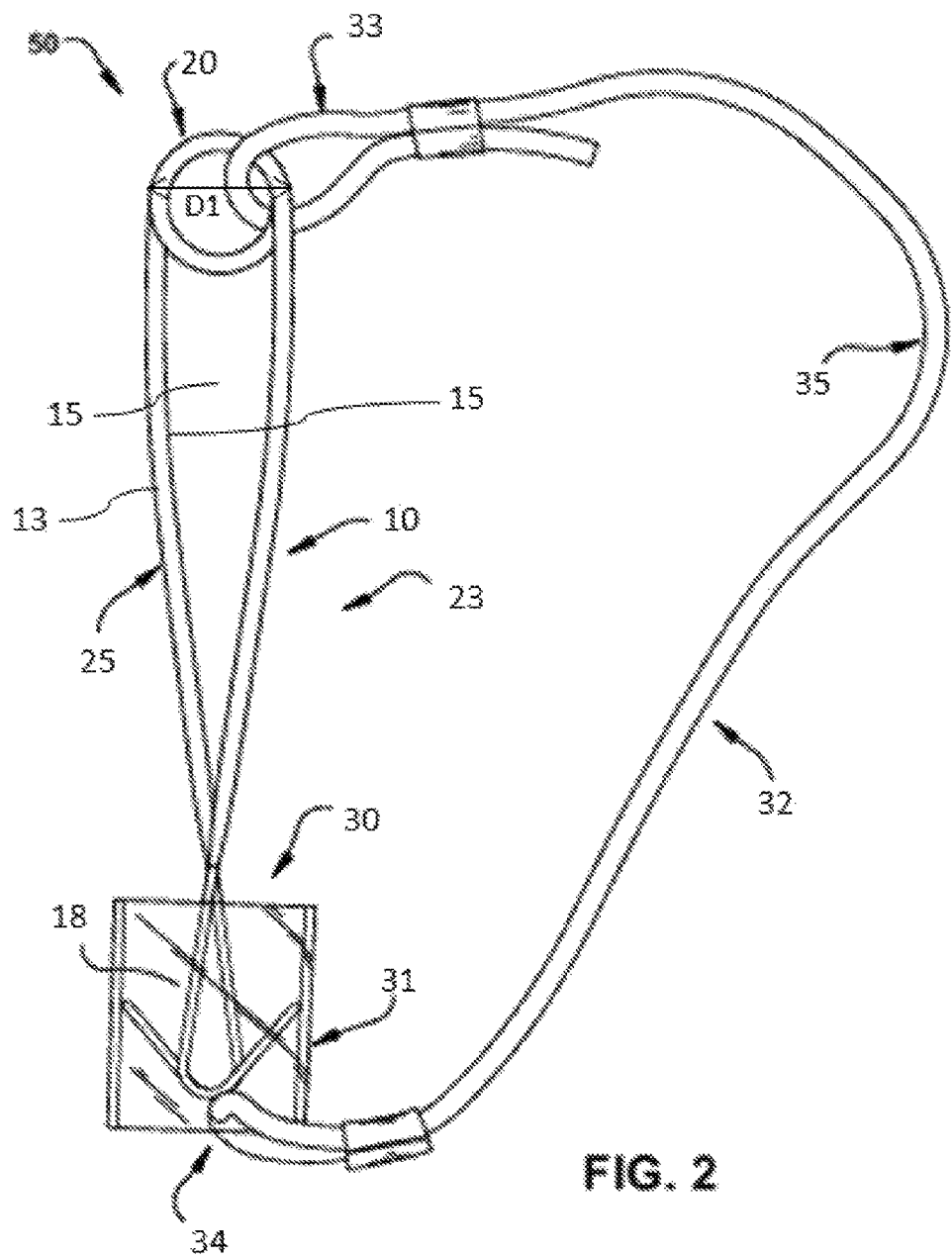
FIG. 2 illustrates an embodiment the game dressing tool in the second position where the spring member is in a compressed state and the hooks are retained by the holder.
Figure 4A:
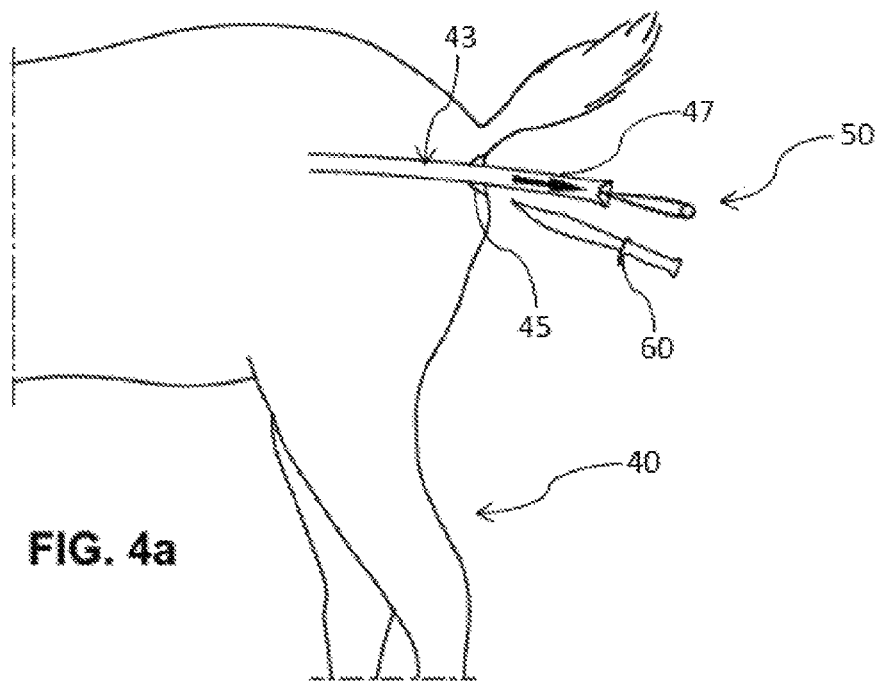
FIG. 4a illustrates another step in field dressing an animal using an embodiment of the game dressing tool.
Figure 4B:
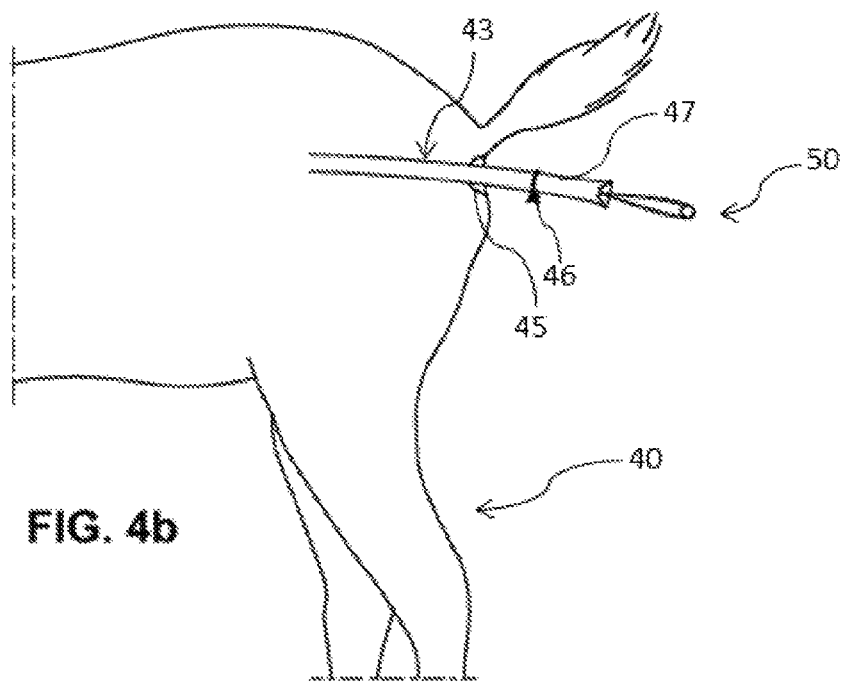
FIG. 4b illustrates another step in field dressing an animal using an embodiment of the game dressing tool.
Figure 5:
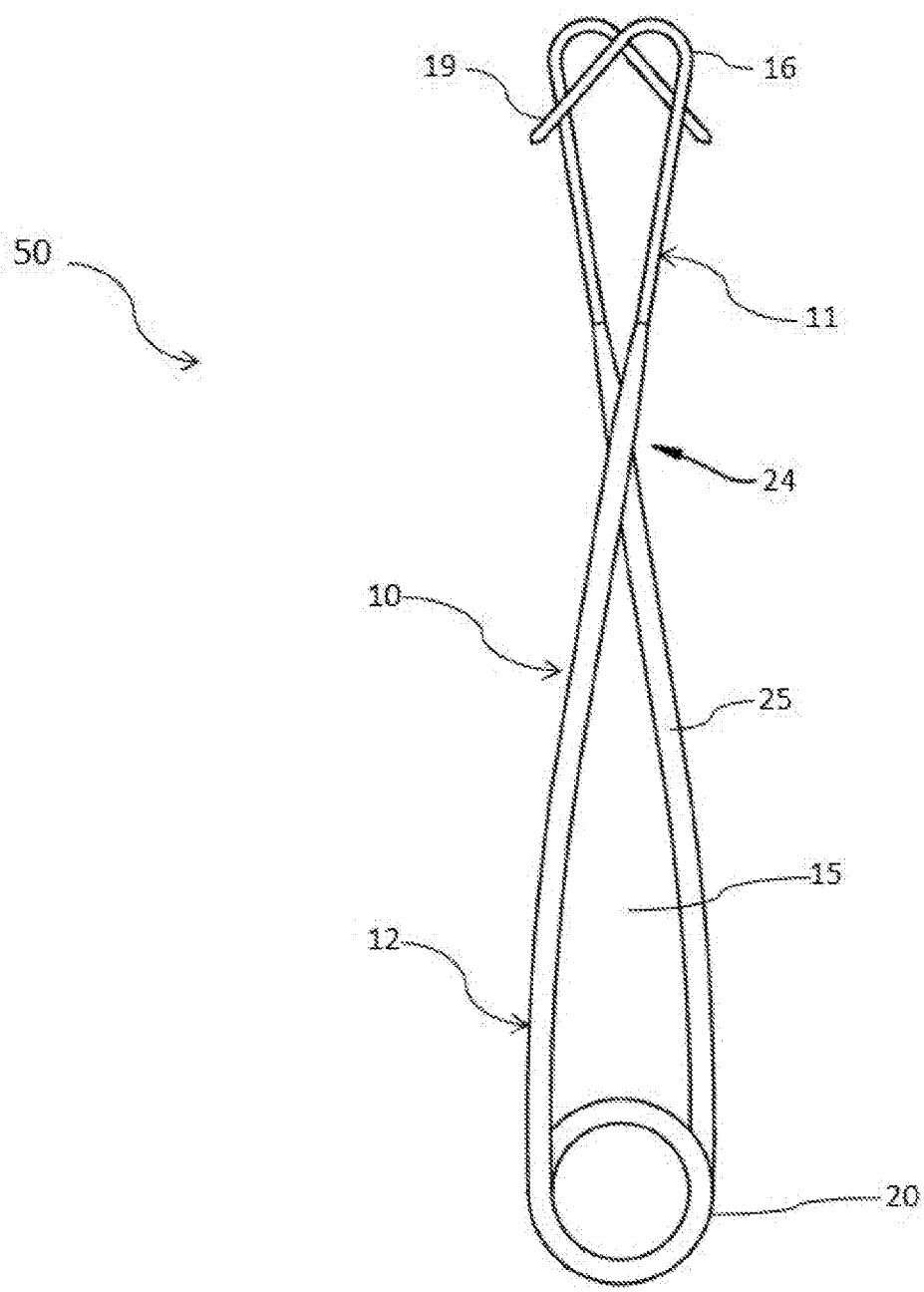
FIG. 5 illustrates an embodiment of the dressing tool in a compressed state.

Referring to FIGS. 1-5, the Game Dressing Tool (tool or device) 50 comprises two stems 10 or legs. As shown in FIGS. 1-2 and 5, each stem or leg 10 has a first end 11 which is coupled to a hook 16 and a second end 12 which is coupled to a spring member 20. Each stem 10 has an outer surface 13 that faces away from the other stem 10 and an inner surface 14 which faces towards the other stem 10. The inner surfaces 14 define an inner space 15 (FIGS. 1-2) whose volume varies in response to the position of the stems 10 in relation to one another. The outer 13 surface and inner 14 surface of the stems 10 are substantially parallel and the cross-section of the stems 10 is substantially circular. It will be appreciated that other embodiments may include stems 10 where the outer 13 and inner surfaces 14 are not substantially parallel or where the cross section of the stems 10 is not substantially circular. In another embodiment, the tool 50 comprises a plurality of stems 10 that may extend in a radial direction from a center point. The stems 10 may be joined together at one end by one or more pivot joints in combination with a spring member 20. In yet another embodiment, the plurality of stems 10 may be made of a resilient material such that a separate spring member 20 may not be required.

The spring member 20 may be a wound coil, a coil spring, a wave spring, a resilient elbow joint, or any type of member or configuration which creates a resilient force between the two stems or legs 10. As shown in FIGS. 1-2 and 5, the tool 50 is formed from a single piece of wire such that the hooks 16, the stems 10 and the spring member 20 are all integral features. Each hook 16 has a terminating surface that is comprised of a sharpened area or portion 19 (FIGS. 1 and 5). The sharpened portions 19 project away from the inner space 15 at an angle that is less than 90 degrees relative to the stem 10. In another embodiment, the hooks 16 may be separate pieces from the stems 10 and attached to each stem 10 using screws, welds, solder or any means appropriate for attaching the hook 16 to the stem 10.

The spring member 20 may join the two stems 10 at or near the vertex or midpoint 17 between the stems 10 such the stems 10 are splayed out to form an angle between them that is less than 90 degrees. In an embodiment, the spring member 20 allows the tool 50 to exist in a first position 22 where the spring member 20 is relaxed (FIG. 1). Referring to FIG. 2, a second position 23 is achieved by squeezing or moving the stems 10 towards each other and thereby compressing the spring member 20. Squeezing the stems 10 closer together causes them to pivot about the vertex 17 or about the spring member 20. The stems 10 may also be made of a resilient material such that squeezing the stems 10 together to compress the spring member 20 causes one or more of the stems 10 to flex inward into the inner space 15. The angle between the two stems 10 may be less in the second position 23 than in the first position 22. The spring member 20 has a diameter D1 (FIG. 1) that is less than the distance D2 (FIG. 1) between the first ends 11 of the two stems 10 when the spring member 20 is in the first position 22.

Referring to FIG. 5, the stems 10 and the spring member 20 may be configured to be compressed such that the stems 10 intersect each other at a point 24 between the hooks 16 and the spring member 20. Further compression may allow the point 24 of intersection to travel in a direction towards the spring member 20. In other embodiments, the stems 10 may be molded from a single piece of resilient material such that no spring member 20 is required. The material may be configured to flex such that the stems 10 pivot about a point that is at or near the vertex 17 (FIG. 2) of the stems 10. The tool 50 may be configured to compress such that the stems 10 intersect each other at a point 24 between the hooks 16 and the vertex 17 (FIG. 2). Further compression may allow the point 24 of intersection to travel towards the midpoint or vertex 17. In another embodiment, the spring member 20 may be supplemented with an additional connection such as a pivot joint to facilitate pivot motion of the stems 10 about the pivot joint as well as providing an additional point to fasten the stems 10 to one another.

Referring to FIGS. 1-2 and 5, the tool 50 may be substantially or completely covered with a coating or material 25 configured to improve the gripping of and the control of the tool 50. The coating 25 may further act to help prevent damage to the tool 50 caused by environmental elements, contact with bodily fluids and physical stress. Such coating 22 is configured to conform to the surfaces of the tool 50 without hindering the device's desired mechanical properties. The flexible properties of the coating 25 also limit the wear and tear of the coating 25 that would result from movement of tool 50 components. It will be appreciated that other embodiments of the tool 50 may be made of a material that improves control and prevents damage to the tool 50 without the aid of a coating 25 or additional layers of material.

In an embodiment, a holder 30 may be used to store or sheath the tool 50 when not in use (FIGS. 1-2). Referring to FIG. 2, the holder 30 may retain the hooks 16 in the second position 23 where the spring member 20 is in a compressed state. As shown, the holder 30 comprises a sleeve 31 that is open at the top and the bottom, however other embodiments may have a sleeve 31 that is open at only one end. The sleeve 31 may be of any cross-section suitable for retaining the desired portion of the tool 50. The holder 30 may be formed or molded from a single piece of material suitable to protect the tool 50 from damage such as plastic, metal, rubber or a composite. In an embodiment, the holder is coated with the same protective coating 25 that is used to coat the tool 50. The holder 30 is configured to protect an individual from inadvertently being injured by the hooks 16 when the tool 50 is placed in the holder 30. As shown in FIG. 2, the holder 30 may be transparent or translucent to allow the user to visualize the portion 18 of the device 50 being sheathed. It will be appreciated that other embodiments of the holder 30 may retain the tool 50 in a position where the spring member 20 is in a relaxed state. It will further be appreciated that other embodiments of the holder 30 may substantially or completely house the tool 50. In yet another embodiment, the holder 30 may be directly attached to or integral to the tool 50. The holder 30 may be retained on the tool 50 at or near the second end 12 of the legs 10. The holder 30 may be configured such that sliding the holder 30 toward the first end 11 of the legs 10 causes the legs 10 move towards one another and thereby compress the spring member 20.

Still referring to FIGS. 1 and 2, a lanyard 32 may be attached to the tool 50 at a first end 33 and a portion of the holder 30 at the second end 34. The lanyard 32 may be configured to couple the holder 30 to the tool 50 as well as provide a point of attachment 34 to attach the tool 50 to a piece of clothing, a vehicle, a piece of hunting equipment or any other surface. The lanyard 32 is configured to withstand environmental and biological elements as well as physical stress. In another embodiment, the lanyard 32 may be made of the same material as the tool 50. In yet another embodiment, the holder 30 may be directly attached to or integral to the tool 50 such than a lanyard 32 is not required.

Figure 3A:
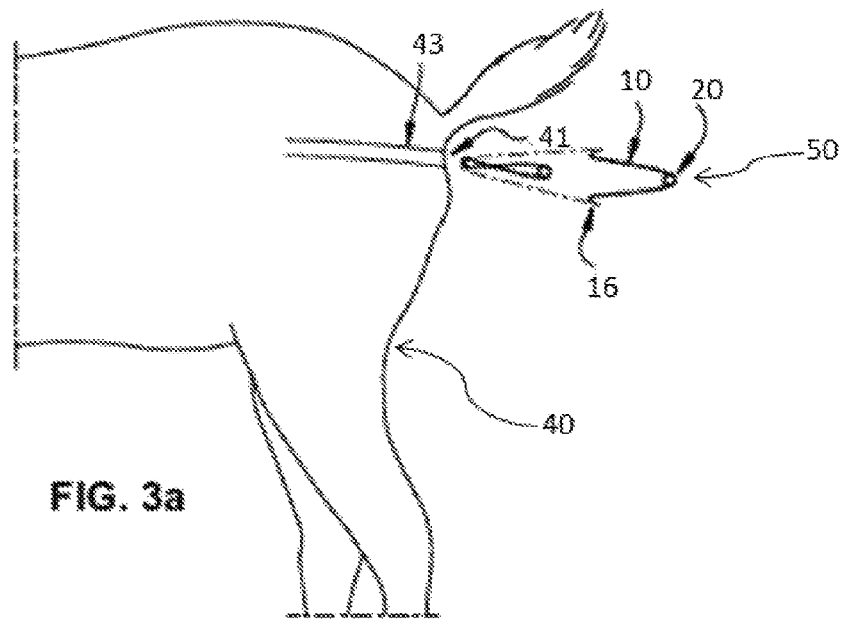
FIG. 3a illustrates a step in field dressing an animal using an embodiment of the game dressing tool.
Figure 3B:
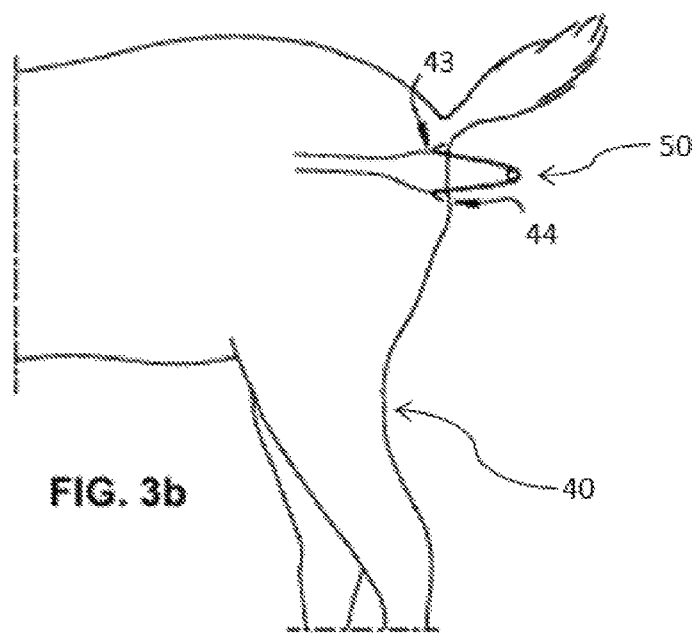
FIG. 3b illustrates another step in field dressing an animal using an embodiment of the game dressing tool.
Figure 6:
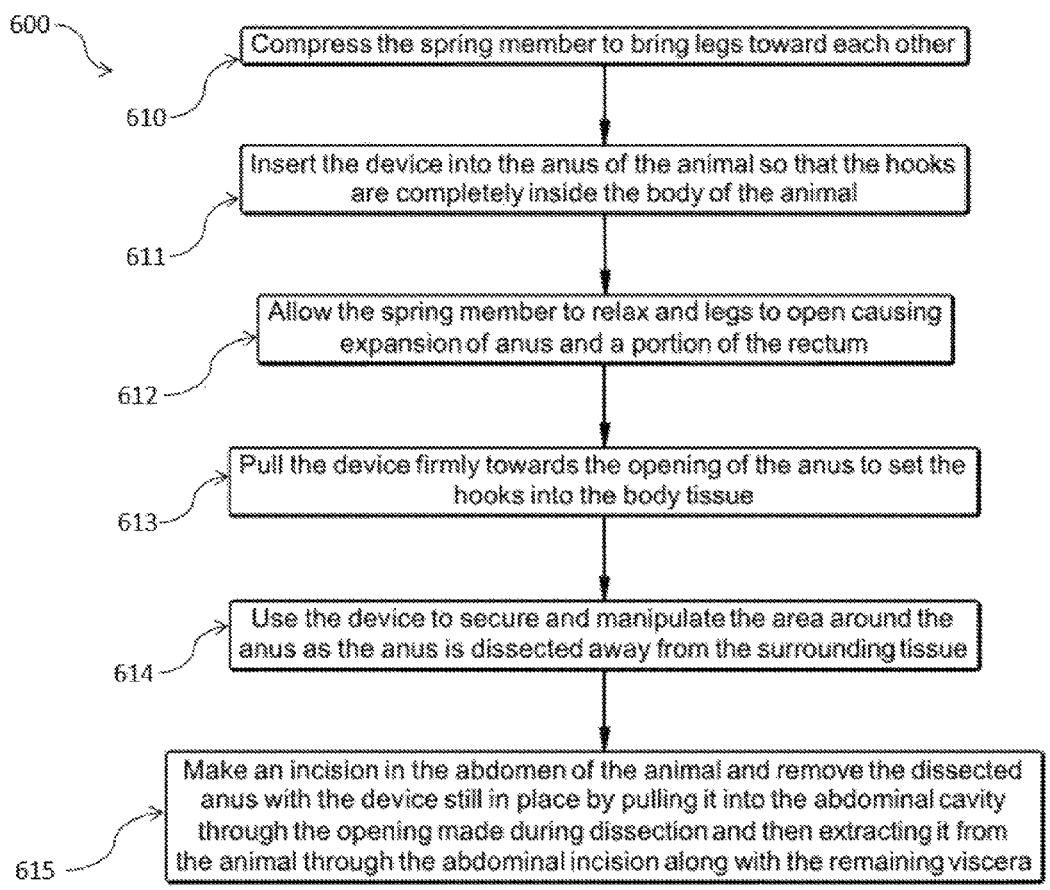
FIG. 6 is a flow chart explaining the method of using the dressing tool.

Referring to FIGS. 1-5 and FIG. 6, steps 610-615, during the field dressing stage, the tool 50 is compressed to the second position 23 (FIG. 2, step 610), and inserted into the anus 41 of the animal 40 so that the entirety of each hook 16 is located within the anal cavity 36 as shown in FIGS. 3*a*-3*b* (step 611). The hooks 16 are bent at an angle such that they may be inserted into the anal cavity 36 or rectum 43 of an animal 40 when the tool 50 is in the second position 23 without the sharpened portion snagging or ripping the sides of the anus 36 or rectum 43. Once inserted, the spring member 20 is allowed to relax to the first position 22 (FIGS. 1 and 3*b*), thereby causing the stems 10 to open and the angle between the stems 10 to increase (FIG. 6, 612). The opening of the stems 10 causes a portion of the rectum 43 and the anus 41 to expand (FIG. 3*b* and FIG. 6, 612). As described in 613, the user then pulls the tool 50 firmly towards the opening of the anus 41 to set the hooks 16 into a portion of the rectum tissue 40 and the tissue surrounding the anus 44 as shown in FIG. 3*b*. The device is now installed in the animal 40 and the surrounding tissue 44 of the anus 41 is secure.

Referring to FIG. 4*a*, once the surrounding tissue 44 is secured, the user then grasps and pulls the tool 50 in the direction opposite to that of insertion (indicated by an arrow in FIG. 4*a*) and uses a knife 60 to dissect the expanded anus 41 from the surrounding tissue 44 as described in 614. By expanding the anus 41, the user is better able to determine its boundaries which greatly reduces the chance of accidental perforation and contamination of the meat during field dressing. The act of pulling on the tool 50 at the time of dissection stabilizes the surrounding tissue 44 so that dissection of the anus 41 may be done more easily and safely. Once the anus 41 is free from the surrounding tissue 44, the user pulls the device further to expose part 47 of the rectum 43 as shown in FIGS. 4*a*-4*b*. The user then occludes or ties 46 the exposed part 47 of the rectum 43 to prevent fecal matter and other digestive matter from leaking out and contaminating the site (FIG. 4*b*).

Next, as described in 615, the user opens the abdominal cavity and removes the viscera, including the organs of the gastrointestinal tract and the dissected anus 41. The occluded rectum and dissected anus 41, with the tool 50 still attached, is pulled through the dissected area 45 surrounding the anus 41 as the internal viscera are removed from the animal 40. Leaving the tool 50 attached allows the user to verify that no portion of the anus 41 or rectum 43 is inadvertently left inside the animal 40.

Additional embodiments include any one of the embodiments described above and described in any and all exhibits and other materials submitted herewith, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. A game dressing tool configured to secure tissue surrounding and including an animal's anus, the game dressing tool comprising:
    two legs, each of the two legs having a first end and a second end;
    two hooks, each of the two hooks terminating the first end of one of the two legs, each of the two hooks comprising a sharpened portion, wherein the two hooks project away from each other at an angle that is less than 90 degrees relative to a corresponding leg;
    a spring member configured to couple each of the two legs at the second end, and forming an angle between the two legs that is less than 90 degrees, the spring member defining a first position when the spring member is uncompressed, and defining a second position when the spring member is compressed, wherein a diameter of the spring member is less than a distance between the first ends of the two legs when the spring member is in the first position; and
    a sleeve configured to fit over the two hooks and at least a portion of the two legs.

2. The game dressing tool of claim 1, further comprising a protective coating covering at least the two legs and the spring member.

3. The game dressing tool of claim 1, further comprising a lanyard, the lanyard having a first end and a second end, the first end is configured to couple to the spring member and the second end is configured to couple to a portion of the sleeve.

4. The game dressing tool of claim 1, wherein the spring member is a coil spring.

5. The game dressing tool of claim 1, wherein the spring member is a resilient elbow joint.

6. The game dressing tool of claim 1, wherein the two hooks are integral to the two legs.

7. The game dressing tool of claim 1, wherein the spring member is integral to the two legs.

8. The game dressing tool of claim 1, wherein the sleeve is coupled to the spring member.

9. A method of field dressing a wild game carcass with a game dressing tool with two legs, wherein each leg includes a hook at a first end and wherein each leg is coupled to a spring member at a second end, the method comprising;
    compressing the spring member to bring the two legs together defining a compressed state;
    anally inserting the two legs while in the compressed state into the wild game carcass;
    relaxing the spring member to move the two legs away from each other defining an uncompressed state, and exerting a force in a direction opposite that of insertion to set the hooks into surrounding tissue;
    dissecting an area around an anus of the wild game carcass to free it from the surrounding tissue;
    making an abdominal incision in the wild game carcass, and extracting internal viscera including the dissected anus through the abdominal incision; and
    removing the game dressing tool from the dissected and extracted anus, wherein the abdominal incision and the dissected area enable air to move through the wild game carcass to cool and prevent spoilage of wild game meat.

10. The method of claim 9, wherein the spring member is a coil spring.

11. The method of claim 9, wherein the spring member is a resilient elbow joint.

12. The method of claim 9, wherein the hook is integral to each leg.

13. The method of claim 9, wherein a sleeve is configured to fit over the hook at the first end of each leg to define a stowed state.

14. A game dressing device comprising:
   at least two legs, the at least two legs each having a first end and a second end, the first end attached to at least one hook;
   a spring member configured to engage a portion of each of the at least two legs, the spring member defining a compressed state and an uncompressed state, wherein in the uncompressed state, a distance between the first ends is greater than a diameter of the spring member; and
   a sleeve configured to fit over the at least one hook of each leg to define a stowed state.

15. The game dressing device of claim 14, further comprising a protective coating covering at least a portion of the at least two legs and the spring member.

16. The game dressing device of claim 14, wherein the sleeve is coupled to the spring member.

17. The game dressing device of claim 14, wherein the spring member comprises a coil spring.

18. The game dressing device of claim 14, wherein the spring member comprises a resilient elbow joint.

19. The game dressing device of claim 14, wherein the spring member is integral to the at least two legs.

20. The game dressing device of claim 14, wherein a pivot joint is configured to couple the at least two legs together at the second end.

* * * * *